Figure 1:
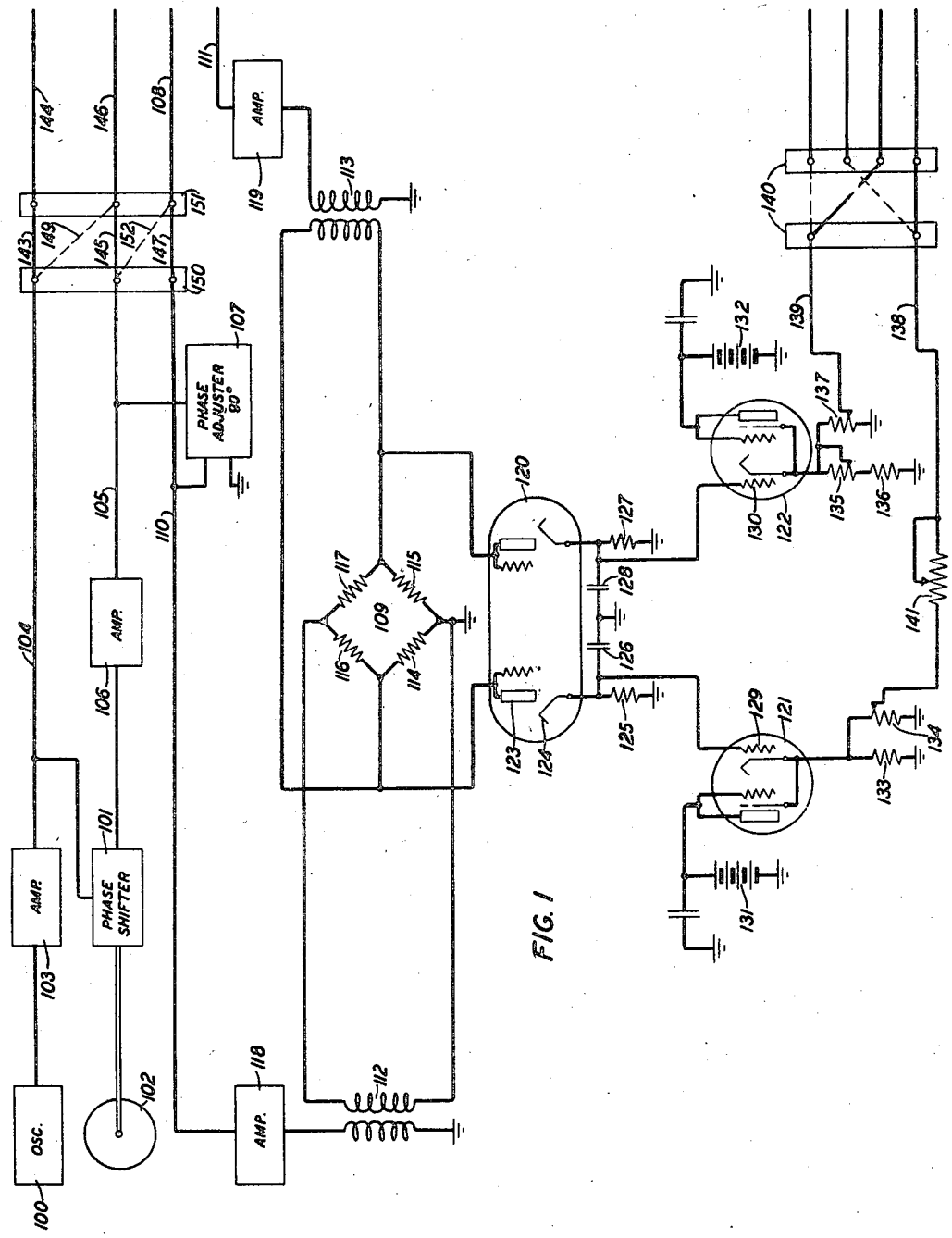

INVENTOR
W. W. FRITSCHI
BY
ATTORNEY.

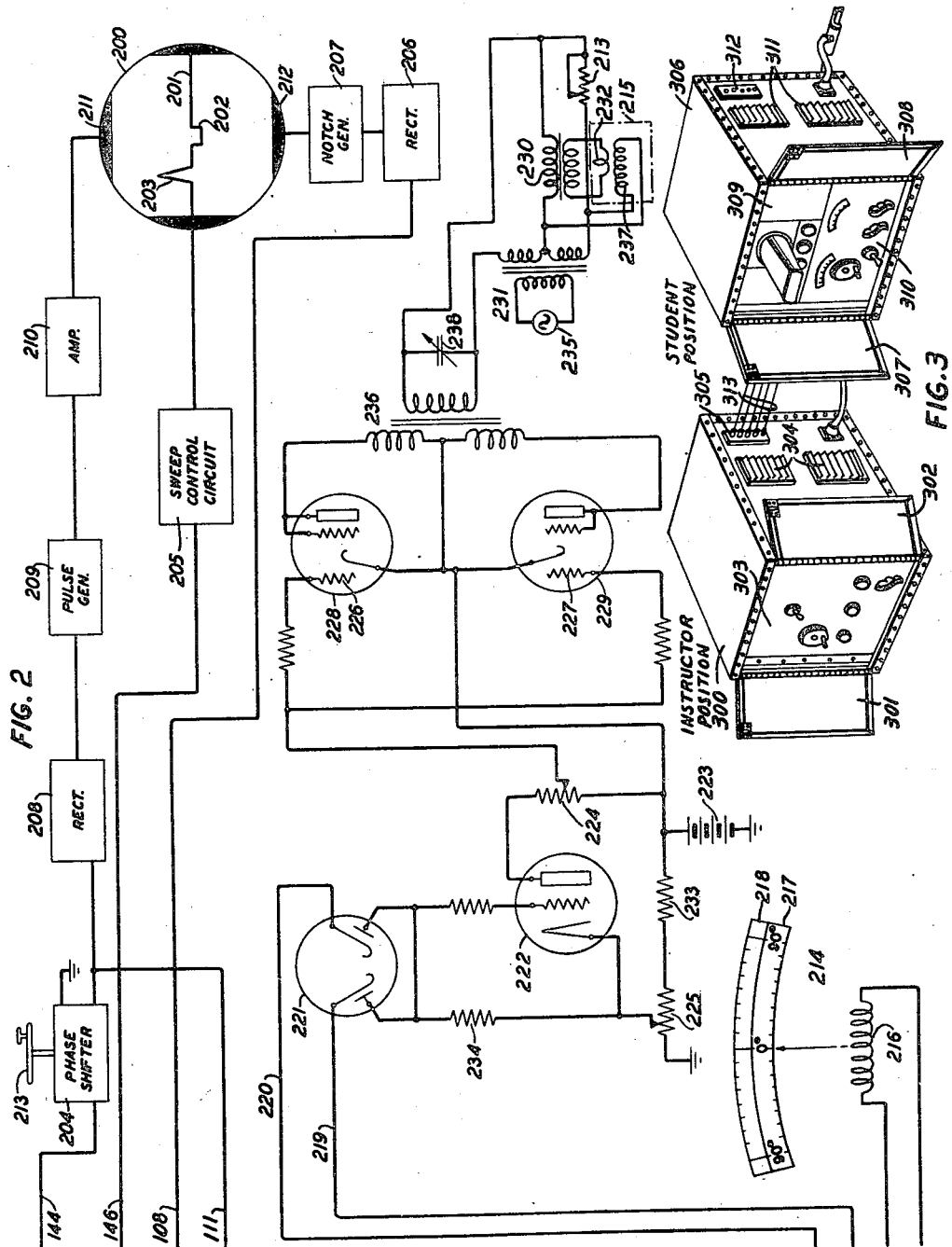

Patented June 1, 1948

2,442,351

UNITED STATES PATENT OFFICE 2,442,351

TRAINING DEVICE FOR OBJECT LOCATING SIGNALING SYSTEMS

Walter W. Fritschi, Manhasset, N. Y., assignor to Bell Telephone Laboratories, Incorporated, New York, N. Y., a corporation of New York Application December 6, 1943, Serial No. 513,065

6 Claims. (Cl. 35—10)

This invention relates to signaling systems and apparatus particularly when used for training students in the art of locating distant objects.

Systems have been devised and are now in use for deriving a continuous measurement of the range and angular location of an airplane or other object moving at a variable speed in space. These locating systems make use of directive radio impulses which are transmitted from the point of observation to the moving airplane from which they return as echo impulses. The returning impulses are received and utilized to form images on a screen before the operator, and the character and behavior of these images afford a continuous representation of the range and angular location of the moving airplane. The operator is also provided with adjustable means, such as handwheels, which he manipulates to follow or otherwise control these changing images. Devices responsive to the operator's handwheels as he follows the moving airplane provide the necessary information for training guns on the moving airplane as a target.

Training systems have also been devised for giving students a preliminary course of training in the art of manipulating the object-locating systems. To this end the courses of imaginary airplanes in space are generated automatically in terms of varying electrical quantities representative of range and angular dimensions, and these varying electrical quantities are used to produce images on a screen before the student corresponding to those which the operator observes when engaged in locating a real airplane. The student is likewise provided with manually operable devices, such as handwheels, which he manipulates to simulate the act of following the imaginary object. Since the student's proficiency in following the range, for example, of the imaginary airplane cannot be determined by the result of the guns for which the range information is derived, as would be the case in an actual installation, it is very desirable to provide some other means in the training equipment capable of measuring the student's accuracy.

An object, therefore, of the present invention is to detect the presence of error on the part of the student in the operation of object-locating systems.

Another object is to obtain a cumulative or integrated record of the error of the student over a given period of time.

These and other objects of the invention are realized by means of a system in which the signals representing the range of the imaginary course being generated are compared with the signals which the student controls in his effort to follow the range of the imaginary object, and in which the results of the comparison are utilized to represent the student's error. More specifically the range dimension of the imaginary course generated by the training system is represented by varying the phase of an alternating wave taken from a base source, and the student endeavors to follow this variable range by varying in like manner the phase of a second wave taken from the same source. To achieve this result he observes the images on the screen before him and manipulates his handwheel for the purpose of maintaining a definite relation between these images. As long as he is able to maintain the desired relation between the images, the phase change which he thereby introduces into the second wave is the same as the phase change which the course generator introduces into the first wave, and he is, therefore, following the range of the imaginary object accurately, and no error exists. However, if the student fails at any instant to maintain the correct image relation, a corresponding difference exists between the phase changes in the first and second waves, and this difference is a measure of the student's error at that instant.

According to a feature of the invention, therefore, the student's error at any instant may be indicated on a meter or recorded on a suitable recording device by comparing the phases of the first and second waves above mentioned and by utilizing the discrepancy in the changing phases to indicate or record both the sense and magnitude of the student's error at that instant.

According to another feature of the invention, means are provided for integrating the total error of the student in a given period of time such as the period representing an observed imaginary flight. More specifically, a recording meter driven by a motor or other suitable device is set in motion whenever the student is in error and is driven at a speed proportional to the instantaneous magnitude of the error.

The foregoing and other features of the invention will be discussed more fully in the following detailed specification.

In the drawings accompanying the specification:

Figs. 1 and 2 illustrate diagrammatically a portion of the equipment at the instructor's position and at one of the student's positions of a training system together with the associated circuits and apparatus for determining the error of the student; and Fig. 3 illustrates the instructor's apparatus cabinet and one student's apparatus cabinet as they would be set up for training purposes.

The apparatus at the instructor's position is mounted in an apparatus cabinet 300, shown in Fig. 3, having front closure doors 301 and 302, and a control panel 303. The sides of the cabinet are provided with ventilation slots 304 and with cable jacks, such as 305, by which the cabinet may be connected with one or more students' positions. The apparatus at a student's position is mounted in an apparatus cabinet 306, shown in Fig. 3, having front closure doors 307 and 308, a panel 309 on which an oscilloscope and controls therefor are mounted, a control panel 310. The sides of the cabinet 306 are provided with ventilation slots 311 and with cable jacks, such as 312, by which the cabinet may be connected by plug-ended cables 313, with the instructor's apparatus cabinet 300 and with other students' cabinets similar to cabinet 306.

The instructor's position is equipped with an oscillator 100 which serves as a base source of alternating waves of predetermined frequency and amplitude. The instructor's position is also provided with a generator for simulating courses of flight of imaginary objects in space in terms of varying electrical quantities. One of the dimensions of the course developed by this course generator is the range from the point of observation, and this dimension is represented by the varying phase of a wave taken from the source 100. To this end the course generator includes a phase shifter 101 driven by a suitable motor 102 to produce in a wave taken from the source 100 and amplified by the amplifier 103 a changing phase which affords a continuous representation of the range of the imaginary object moving along the simulated course.

The student's position is equipped with a cathode beam oscilloscope 200 having a luminous screen on which images are formed. These images include a horizontal trace 201 having a stationary notch 202 fixed therein near the center of the screen and a range mark or pip 203 which moves along the trace 201 in accordance with the varying range of the imaginary object in space. These image marks on the screen of the oscilloscope 200 are formed under the control of the range wave appearing in the output circuit of the phase shifter 101 and under the control of a second wave taken from the source 100 and applied over conductors 104, 143, and 144 to a phase shifter 204 at the student's position. The range wave, after undergoing amplification in a suitable amplifier 106, is applied over conductors 105, 145, and 146 to the oscilloscope sweep circuit 205 and also through a phase adjuster 107 over conductors 110, 147, and 108 to the rectifier 206 and notch generator 207. The sweep control circuit 205 and the rectifier and notch generator 206 and 207 serve to control the cathode beam of the oscilloscope 200 to sweep the trace 201 across the screen and to form the notch 202 therein in synchronism and in phase with the range wave appearing in the output circuit of the range phase shifter 101. The second wave of base frequency, appearing in the conductor 104, passes through the phase shifter 204 and thence through the rectifier 208, pulse generator 209 and amplifier 210 to the vertical deflection plates 211 and 212 to the oscilloscope 200. The pulses thus delivered to the vertical plates of the oscilloscope cause the formation of the range pip 203 which will move along the trace 201 under the influence only of the changing phase of the wave in conductor 105 as long as the student's phase shifter remains at rest. However, the student's objective is to bring the image pip 203 into the stationary notch 202 and to hold it there by manipulating the phase shifter 204. He undertakes to achieve this result by manipulating the handwheel 213 at a rate which will introduce into the wave applied to the phase shifter 204 a phase change which is identical with the phase change automatically introduced in the range wave by the phase shifter 101 of the course generator. As long as the student's manipulation of the phase shifter 204 is accurate, the image pip 203 remains centered in the notch 202, and the student's effort corresponds to the accurate tracking of the range of the imaginary object in space.

An alternative image relationship on the oscilloscope may be obtained by changing the jumper connections at the cross-connecting frame 150—151. In this alternative relationship the notch 202 moves on the screen in accordance with the changing range, and the pip 203 is controlled as before by the student's phase shifter 204. The necessary change at the connecting frame is effected by adding the jumper wires 149 and 152 and by disconnecting the jumper wires 145 and 147. In this case the sweep control circuit is synchronized by the base frequency, the notch position is controlled by the phase shifter 101 through the amplifier 106 and the position of the pip is controlled by the student's phase shifter 204. The phase adjuster 107 now serves only for the purpose of aligning the zero reading of the phase detector 109 with zero error as described below.

Considerable skill is required on the part of the operator to follow the range accurately throughout the observed flight of a moving object, such as an airplane. It is to be expected therefore that students will err in varying degrees depending upon their proficiency, and it is very desirable to have some means for grading the students on the basis of the error they make in following the course of the imaginary airplane.

For this purpose a meter 214, which can be designed to indicate or record on a moving paper or otherwise the instantaneous values and sense of the student's error, is provided for the student's position; and an integrating meter 215 is also provided for recording the cumulative error made by the student during a predetermined period of time, such as the flight period of the airplane.

These indicating recording meters are operated under the control of voltages derived from the resistance bridge circuit 109. The bridge 109 is excited by voltage waves taken from the output circuits of phase shifters 101 and 204. It will be noted that the voltage wave in conductor 110 has the same changing phase as the range wave in conductor 105, except that a constant shift of 90 degrees is introduced by the phase shifter 107. Also, it will be noted that the wave in conductor 111 has the same phase as the wave in the output circuit of the student's phase shifter 204. These two voltage waves are applied through input transformers 112 and 113 to the resistance bridge 109 which comprises the individual resistors 114, 115, 116 and 117.

If the output wave from the student's phase shifter 204 is exactly in phase with the range wave in the output conductor 105 and if these waves are assumed to be of like shape and of equal maximum amplitudes, it may be determined by analysis that the average amplitudes, for each cycle of these waves, of the voltage waves developed across the resistors 114 and 115 are equal. The circuit elements controlling these voltage waves may be designed to insure similarity in wave shape, and suitable amplifiers 118 and 119 may be provided for controlling the amplitudes of the waves applied to the transformers 112 and 113. It may also be determined by analysis that any inequality between the phase angle of the wave in the output circuit of the student's phase shifter 204 and the phase angle of the wave in conductor 110 is reflected by a corresponding inequality in the voltages developed across the resistors 114 and 115 of the bridge. For example, if the student in his effort to follow the range of the moving object in space errs at any instant by a phase angle $\theta$, the voltages across the resistors 114 and 115 will differ at that instant by an amount which is substantially proportional to the magnitude of the angle of error. The sense of the error will determine the sense of the inequality in the voltages. That is to say, if the phase of the student's wave lags behind that of the range wave, which may mean that he is short of the target, the voltage across one of the resistors 114 or 115 will exceed that across the other resistor by an amount commensurate with the lagging error angle; whereas, if the student's wave leads the range wave by a similar angle of error, the inequality of the voltages across resistors 114 and 115 is reversed.

Thus, the manipulation of the phase shifter 204 by the student in his effort to follow the range of the imaginary object is continuously represented by the voltages across the resistors 114 and 115, and these voltages vary in accordance with the precision with which the student manipulates his phase shifter. Each instant that his phase shifter is in position corresponding to the correct range, the voltages across these resistors are equal. However, each instant that the phase shifter is in an incorrect position, indicating an error of one sense or the other, the voltages are correspondingly unequal, and the degree of inequality is a measure of the magnitude of the error. These voltages are applied first to a rectifier 120 and then to amplifier tubes 121 and 122, and the output voltages in the circuits of the tubes 121 and 122 are utilized to operate the error indicating or recording meter 214 and the error integrating meter 215.

During the positive half cycles of the voltage wave in the resistor 114 current flows from the anode 123 to the cathode 124 and thence to the junction point between resistor 125 and condenser 126. Similarly, during positive half cycles of the wave in resistor 115 current flows through the other half of the rectifier 120 to the junction point between resistor 127 and condenser 128. The condensers 126 and 128 assume charges which are proportional to the average amplitudes of the voltage waves appearing across the resistors 114 and 115. These average voltages cause the application of corresponding positive potentials to the control grids 129 and 130 of the amplifier tubes 121 and 122. The tubes 121 and 122 may be of any suitable and well-known type and are designed to pass current from the batteries 131 and 132 through the anode-cathode circuits and through the resistors in the output circuits of these tubes. For example, when tube 121 conducts in response to the application of positive potential to the control element, current flows from the battery 131 through resistors 133 and 134 to ground, raising the upper terminals of these resistors to a corresponding positive potential. Likewise, when tube 122 conducts, current flows form battery 132 through resistors 135, 136 and 137 to ground, raising the upper terminals of these resistors to a corresponding positive potential.

The output circuits of the tubes 121 and 122 are connected over conductors 138 and 139 to the connecting frame 140, and thence to the operating winding 216 of the meter 214. Thus when the voltages across the resistors 114 and 115 of the bridge are equal, the conductors 138 and 139 are at equal potentials, and no current flows through the meter winding 216. Hence the needle of the meter (or the recording element if a recording meter is used) stands on the mid-scale point which indicates a zero angle of error on the lower scale 217. If desired, a second scale 218 may be provided and calibrated to indicate the range error in yards. When, however, the voltage across one of the coils 114 or 115 exceeds that across the other coil, the voltages across the resistors in the output circuits of amplifiers 121 and 122 likewise become unequal, and current flows through the meter winding 216. If the inequality is such that conductor 138 is more positive than conductor 139, current flows in one direction and the intensity of the current is a measure of the voltage difference, whereupon the meter needle assumes a position in one half of the scale which indicates both the sense of the error and its magnitude. On the other hand, if the conductor 139 is more positive than conductor 138, current flows in the opposite direction through the winding 216 of the meter and the needle assumes the proper position in the other half of the scale. Thus, at any instant it is possible to observe the student's performance by noting the needle deflection of the meter 214. By utilizing a recording meter of any well-known type it is possible to preserve the record of the student's performance for future analysis. A variable resistance 141 is included in the circuit to permit expansion or calibration of the scale of either the visual or graphic indicator.

Variable resistances 134, 135 and 137 are provided to compensate for variations in amplification between the resistance bridge 109 and the output circuit of tubes 121 and 122 due to manufacturing variations or ageing of component parts.

The output conductors 138 and 139 from the amplifiers 121 and 122 may also be connected at the frame 140 to the control circuits of the integrating meter 215. If this is done, the voltages on conductors 138 and 139 are applied over conductors 219 and 220 to the double-diode rectifier 221. When these voltages are equal, the rectifier 221 does not conduct current, and maximum current flows in the anode-cathode circuit of the tube 222. This condition is obtained by adjusting potentiometer 225 to apply a positive potential equal to those on leads 219 and 220. The circuit of tube 222 may be traced from the positive pole of battery 223, resistor 224, anode and cathode of tube 222, resistor 225 to ground. The voltage drop in the resistor 224 applies a negative biasing potential to the control grids 226 and 227 of tubes 228 and 229, thus preventing these latter tubes from conducting. As long as the tubes 228 and 229 fail to conduct, no current flows through the transformer 230 from the secondary windings of the transformer 231, and hence no current flows through the current winding 232 of the integrating meter 215. As soon, however, as an error appears in the student's manipulation of his phase shifter 204, the potentials on conductors 219 and 220 become unequal (one increases in magnitude, the other decreases), and the rectifier 221 conducts current through one or the other of its electrode paths, depending on which of the two conductors 219 or 220 is less positive than the setting of potentiometer 225. Assume, for example, that conductor 220 is made less positive than the setting of potentiometer 225. Current flows from battery 223, resistor 233, resistor 234, through the rectifier elements of tube 221 to conductor 220. On the other hand, if the positive potential on potentiometer 225 exceeds that on conductor 219, current flows in the same direction through resistor 234 and through the other pair of electrodes of the rectifier 221 to lead 219. In this manner either leading or lagging errors are made to influence the integrator circuit in like manner. In either case the voltage across the resistor 234 causes the application of a corresponding negative potential to the control grid of the tube 222, thereby reducing the current flow through the resistor 224. This reduction of current in the resistor 224 decreases the negative bias on the grids of tubes 228 and 229, permitting them to conduct by a corresponding amount. Current now flows from the source 235 through transformer 231, thence through the primary winding of the transformer 236, the secondary windings of transformer 236 being effectively closed by the lowered impedance of the tubes 228 and 229. Current flowing through the primary winding of transformer 230 induces current in the secondary winding which, in turn, flows through the current coil 232. At the same time the voltage coil 237 is excited, and the meter 215 operates at a speed which is exactly proportional to the instant magnitude of the student's error whether leading or lagging. Thus, whenever the student is in error in the manipulation of his phase shifter, the meter 215 is operating and at a speed proportional to the error. Therefore, at the end of a given interval of time the meter 215 will have recorded the total amount of error made by the student.

Capacitor 238 and variable resistor 213 are provided to balance the bridge circuit consisting of the split secondary windings of transformer 231, resistor 213, and the combined impedance of capacitor 238 and secondary of transformer 236 when tubes 228 and 229 are non-conducting.

For the sake of simplicity, much of the equipment constituting the student-training system, such as the oscillator 100, the amplifiers, the phase shifters, the rectifiers, the pulse generators, and the apparatus associated with the oscilloscope, has been disclosed diagrammatically. It will be understood that any suitable devices may be used for this purpose and, in particular, reference is made to the copending application of Andrews and Cesareo, Serial No. 513,042, filed December 6, 1943, now Patent No. 2,438,888, for a more complete description of a system of this character.

While the invention has been illustrated in connection with a system in which a course generator simulates, in terms of electrical quantities, the courses of imaginary objects in space, it will be understood that these varying electrical quantities could, if desired, be made to represent the courses of real objects.

What is claimed is:

1. In apparatus for training in locating the course of an object moving in space, the combination of a screen visible to the operator of said apparatus, a source of alternating current, means for utilizing two variable waves taken from said source to form on said screen images which vary in accordance with the changing course of said object, means manipulated by the operator for varying one of said waves in his effort to follow said course, and means operated in accordance with the variations of said waves for indicating the error made by the operator if he fails to follow said course accurately.

2. In apparatus for training in locating the course of an object moving in space, the combination of a screen visible to the operator of said apparatus, a source of alternating current, means for utilizing waves from said source to form on said screen images which vary in accordance with the location of said object, means manipulated by the operator for varying the phase of one of said waves in his effort to follow said object, and means operated in accordance with the varying phase of said last-mentioned wave for indicating the error made by the operator if he fails to follow said course accurately.

3. In apparatus for training in locating the course of an object moving in space, the combination of a screen visible to the operator of said apparatus, a source of alternating current, means for utilizing waves from said source to form on said screen images which vary in accordance with the location of said object, means manipulated by the operator for varying the phase of one of said waves and thereby controlling the relationship of said images in his effort to follow said object, and means operated in accordance with the varying phase of said last-mentioned wave for indicating the error made by the operator if he fails to follow said course accurately.

4. In apparatus for training in locating the course of an object moving in space, the combination of a screen visible to the operator of said apparatus, a source of alternating current, means for varying the phase of a first wave from said source to simulate the varying range of an imaginary object moving along a course in space, means for utilizing said wave of varying phase to form on said screen an image representing the range of said object, means manipulated by the operator for varying the phase of a second wave from said source and thereby controlling said image in his effort to follow the range of said object, and means operated in accordance with the phase variations of said waves for indicating the failure of the operator to follow accurately the range of said object.

5. In apparatus for training in locating the course of an object moving in space, the combination of a screen visible to the operator of said apparatus, a source of alternating current, means for utilizing waves from said source to form on said screen images which vary in accordance with the variations of said course, means manipulated by the operator for varying one of said waves and thereby controlling the relationship of said images in his effort to follow the variations in said course, and means operated in accordance with the variations of said last-mentioned wave for making a cumulative record of the error of said operator.

6. In apparatus for training in locating the course of an object moving in space, the combination of a screen visible to the student, a source of alternating current, means for utilizing two variable waves taken from said source to form on said screen images representing the instant location of an imaginary object moving along an imaginary course in space, means manipulated by the student for varying one of said waves in his effort to follow the location of said imaginary object, and means operated in accordance with the variations of said last-mentioned wave for indicating the error of the student.

WALTER W. FRITSCHI.

REFERENCES CITED

The following references are of record in the file of this patent:

UNITED STATES PATENTS

| Number | Name | Date |
| --- | --- | --- |
| 2,321,799 | Cone | June 15, 1943 |
| 1,939,706 | Karnes | Dec. 19, 1933 |